US009129356B2

(12) United States Patent
Dougal

(10) Patent No.: US 9,129,356 B2
(45) Date of Patent: Sep. 8, 2015

(54) SHOTSPOT SYSTEM

(71) Applicant: Duane Dougal, Everett, WA (US)

(72) Inventor: Duane Dougal, Everett, WA (US)

( * ) Notice: Subject to any disclaimer, the term of this patent is extended or adjusted under 35 U.S.C. 154(b) by 455 days.

(21) Appl. No.: 13/660,925

(22) Filed: Oct. 25, 2012

(65) Prior Publication Data
US 2013/0108106 A1 May 2, 2013

Related U.S. Application Data

(60) Provisional application No. 61/552,406, filed on Oct. 27, 2011.

(51) Int. Cl.
*G06K 9/00* (2006.01)
*G06T 7/00* (2006.01)
*G06K 9/62* (2006.01)

(52) U.S. Cl.
CPC .............. *G06T 7/001* (2013.01); *G06K 9/6202* (2013.01)

(58) Field of Classification Search
CPC .................................................... G06K 9/6202
See application file for complete search history.

(56) References Cited

U.S. PATENT DOCUMENTS 6,260,466 B1 * 7/2001 Humphreys .................. 89/41.06
2009/0161766 A1 * 6/2009 Bronstein et al. ........ 375/240.23

FOREIGN PATENT DOCUMENTS

WO     WO 2010137267 A1 * 12/2010

* cited by examiner

*Primary Examiner* — Bhavesh Mehta
*Assistant Examiner* — Raphael Schwartz
(74) *Attorney, Agent, or Firm* — Pate Baird, PLLC

(57) ABSTRACT

A system for identifying a hit on a target. The system includes a digital camera. The system also includes a computing device configured to produce a reference image of a target prior to a shot occurring. The computing device is also configured to produce a comparison image of the target subsequent to the shot occurring. The computing device is further configured to compare the comparison image to the reference image. The system further includes a networking device configured to connect the digital camera to the computing device.

9 Claims, 6 Drawing Sheets

SHOTSPOT SYSTEM

CROSS-REFERENCE TO RELATED APPLICATIONS

This application claims the benefit of and priority to U.S. Provisional Patent Application Ser. No. 61/552,406 filed on Oct. 27, 2011, which application is incorporated herein by reference in its entirety.

BACKGROUND OF THE INVENTION

Marksmen attempt to hit a specific target as accurately as possible. In particular, they work and train to obtain a high degree of accuracy in their shooting, regardless of their chosen weapon. In some instances, the target is difficult or impossible for the marksman to see with his/her naked eye.

For longer shots, many marksmen use a scope or other optical magnification device. These have a number of drawbacks. For example, they may be difficult to focus. Alternatively, there may be optical obstructions or distortions which prevent a clear view. In addition, currently there is no way to record a target and the hits on the target during a shooting/range session except for 1) imprecise approximations, 2) a spotter making identifying marks on the target as they happen, and 3) the final target.

For extremely long distances the marksman may need a spotter. The spotter is an individual who is closer to the target and relays information to the shooter. However, the communications between the marksman and the spotter may be time consuming and imprecise.

Accordingly, there is a need in the art for a system which can allow the shooter to reliably see both the target and the hits on the target firsthand, even at long distances. Further, there is a need in the art for the system to be able to record an entire session for evaluation purposes.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a system for identifying a hit on a target. The system includes a digital camera. The system also includes a computing device configured to produce a reference image of a target prior to a shot occurring. The computing device is also configured to produce a comparison image of the target subsequent to the shot occurring. The computing device is further configured to compare the comparison image to the reference image. The system further includes a networking device configured to connect the digital camera to the computing device.

Another example embodiment includes a system for identifying a hit on a target. The system includes a digital camera. The system also includes a computing device configured to produce a reference image of a target prior to a shot occurring. Producing a reference image includes taking a stack of similar images in succession using the digital camera. Producing a reference image also includes creating matched pixel sets which include data from the same pixel in each of the stack of similar images. Producing a reference image further includes selecting the median value of each image data point in each matched pixel set. Producing a reference image includes creating a composite image using the selected data from each matched pixel set. The computing device is also configured to produce a comparison image of the target subsequent to the shot occurring. The computing device is further configured to compare the comparison image to the reference image. The system further includes a networking device configured to connect the digital camera to the computing device.

Another example embodiment includes a system for identifying a hit on a target. The system includes a digital camera. The system also includes a computing device configured to produce a reference image of a target prior to a shot occurring. Producing a reference image includes taking a stack of similar images in succession using the digital camera. Producing a reference image also includes creating matched pixel sets which include data from the same pixel in each of the stack of similar images. Producing a reference image further includes selecting the median value of each image data point in each matched pixel set. Producing a reference image additionally includes creating a composite image using the selected data from each matched pixel set. The computing device is also configured to produce a comparison image of the target subsequent to the shot occurring. Producing a comparison image includes taking a second stack of similar images in succession using the digital camera. Producing a comparison image also includes creating matched pixel sets which include data from the same pixel in each of the second stack of similar images. Producing a comparison image further includes selecting the value of each image data point in each matched pixel set that most closely corresponds to the reference image. Producing a comparison image additionally includes creating a composite image using the selected data from each matched pixel set. Producing a comparison image moreover includes reducing the noise in the composite image. The computing device is further configured to compare the comparison image to the reference image. The system further includes a first networking device connected to the digital camera. The system additionally includes a second networking device connected to the computing device and configured to connect the digital camera to the computing device.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
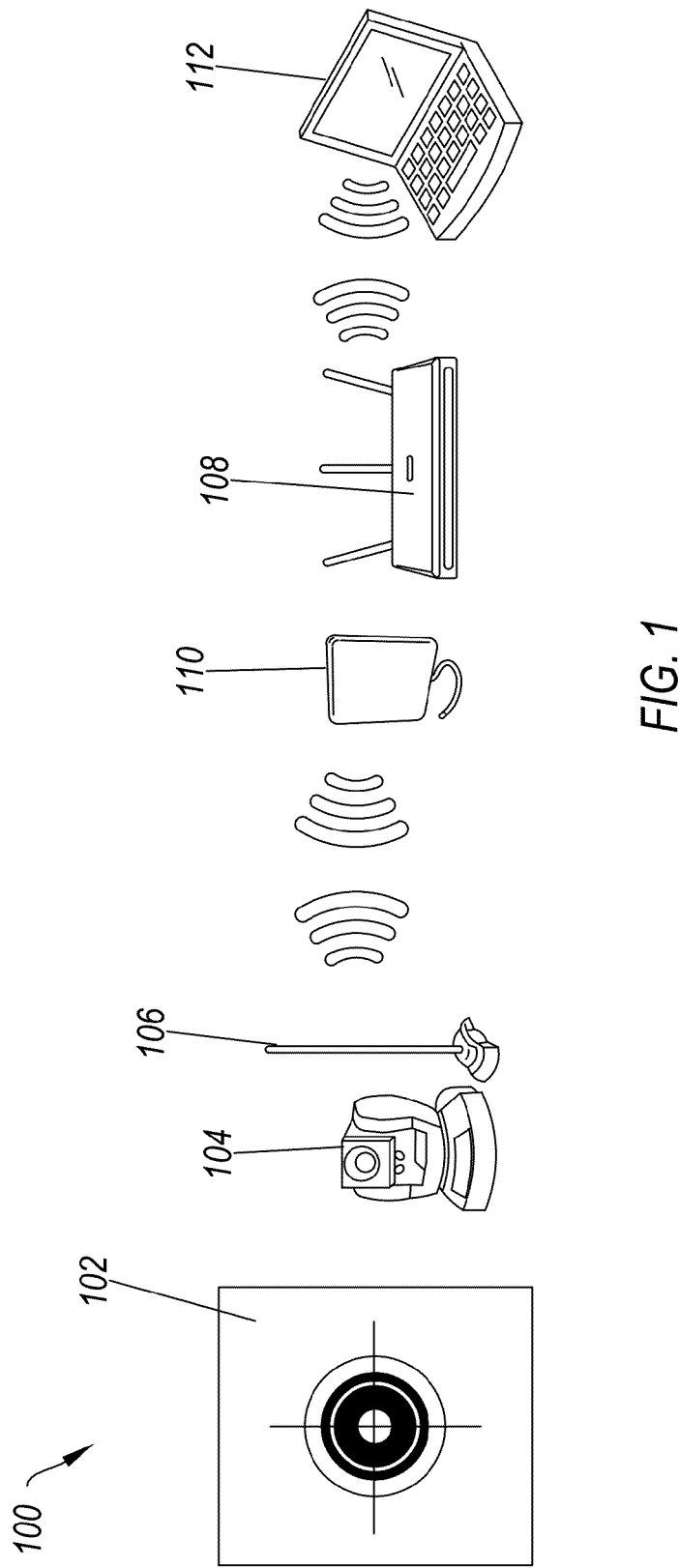
FIG. 1 illustrates an example of a shot detection system.

FIG. 1 illustrates an example of a shot detection system 100. The shot detection system 100 is capable of detecting and mapping a shot to a target. The target may not be visible, or may be visible only with optical magnification, to the shooter. Because of this, the visual detail to determine the accuracy of the shot may be otherwise unavailable. The shot detection system 100 can capture, transmit, and process target images, either for passive viewing of the target (i.e., as a passive spotting scope) or as an active hit detection system.

FIG. 1 shows that the shot detection system 100 can include a target 102. The target 102 can include an object at which the user will be shooting. For example, the target 102 can include a series of circles with a common center becoming progressively larger. One of skill in the art will appreciate, however, that the system 100 can work with any desired target 102.

FIG. 1 also shows that the shot detection system 100 can include a digital camera 104. The digital camera 104 can take images of the target 102 either at regular intervals or when desired by the user. A digital camera 104 is a camera that takes video or still photographs by recording images on an electronic image sensor. The digital camera 104 includes an optical system, typically using a lens with a variable diaphragm to focus light onto an image pickup device. The diaphragm and shutter admit the correct amount of light to the image sensor. One of skill in the art will appreciate that the digital camera 104 can include any device capable of receiving and measuring electromagnetic radiation. For example, the digital camera 104 can include a device that can detect spectra not visible to the unaided human eye, such as infrared, for the purpose of hit detection and image enhancement, or the use of a flash or other light source in any spectrum to reduce or eliminate shadows and to produce uniform illumination detectable by the system.

FIG. 1 further shows that the shot detection system 100 can include a first networking device 106. The first networking device 106 can be connected to the digital camera 104. In particular, the first networking device 106 can allow the images produced by the digital camera 104 to be transmitted to the user for display. The first networking device 106 can be built into the digital camera 104 or can be connected, either wired or wireless, to the digital camera 104. The first networking device 106 can include a router, either wired or wireless, or other device capable of connecting the digital camera to an external device via a network.

The network exemplarily includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network includes one or more cellular RF networks and/or one or more wired and/or wireless networks such as, but not limited to, 802.xx networks, Bluetooth access points, wireless access points, IP-based networks, or the like. For example, the network can include cloud based networking and computing. The network can also include servers that enable one type of network to interface with another type of network.

FIG. 1 additionally shows that the shot detection system 100 can include a second networking device 108. The second networking device 108 can be configured to communicate with the first networking device 106. In particular, the second networking device 108 and the first networking device 106 can communicate to one another either wirelessly or through a wired connection. The second networking device 108 can be located remotely to the first network device 106 to allow a user to receive the images from the digital camera 104 or to provide instructions to the digital camera 104. I.e., the second networking device 108 can be located proximate to a user but remote to the target 102.

FIG. 1 moreover shows that the shot detection system 100 can include a directional antenna 110. The directional antenna 110 can allow the distance between the first networking device 106 and the second networking device 108 to be increased. For example, the directional antenna can include a 1W signal amplifier which allows the first networking device 106 and the second networking device 108 to be separated by up to 2 miles.

FIG. 1 also shows that the shot detection system 100 can include a computing device 112. In at least one implementation, the computing device 112 can include any device which the user wishes to connect to the digital camera 104 through the first networking device 106 and the second networking device 108. For example, the computing device 112 can include a cell phone, a smart phone, a tablet, a laptop/computer or any other desired electronic device. The computing device 112 can be configured to run software which can detect a shot on the target, as described below. Additionally or alternatively, the computing device 112 can also include additional or modified features in the software system, such as a feature that allows the user to interactively correct an error in the Active Hit Detection results, or additional methods for scoring or measuring a hit grouping on the target, or specific integrated ballistics calculations or estimations.

One of skill in the art will appreciate that more than one digital camera 104 and/or computing device 112 can be connected in the shot detection system 100. For example, multiple digital cameras 104 can be connected to a single computing device 112 which can be used to detect shots on multiple targets 102. Additionally or alternatively, a single digital camera 104 can be connected to multiple computing devices 112 which can each display the images captured by the digital camera 104.

Figure 2:
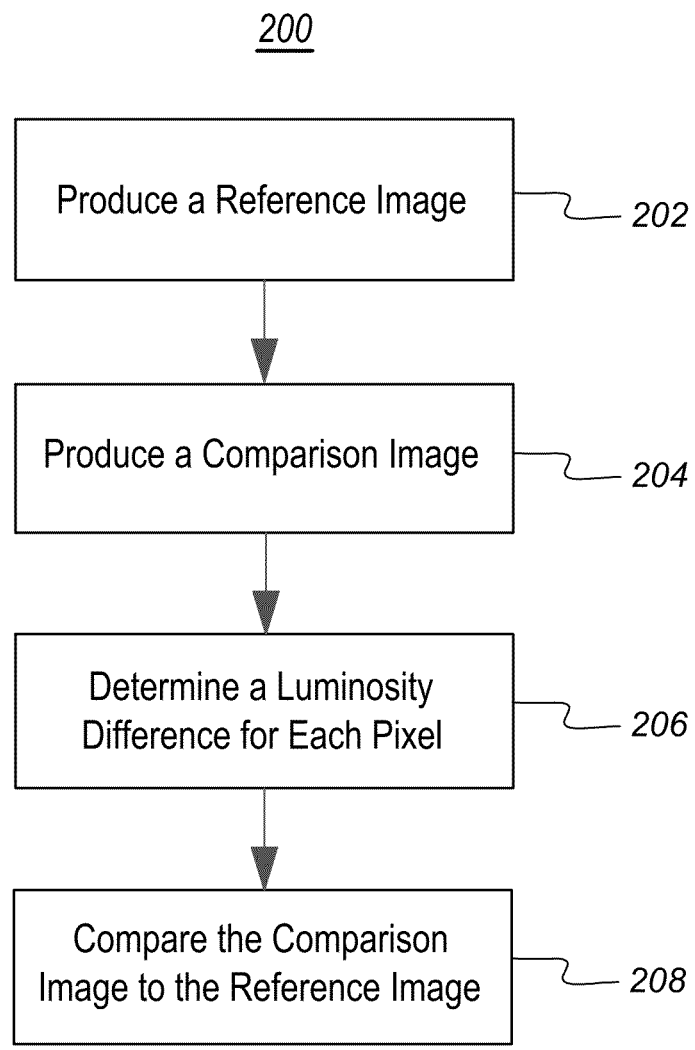
FIG. 2 is a flow chart illustrating a method of detecting a hit to a target.

FIG. 2 is a flow chart illustrating a method 200 of detecting a hit to a target. I.e., the method 200 can automatically identify where a shot has occurred on a target. The method 200 can do so by detecting changes in sequential digital images, as described below. The method 200 can be implemented by the system 100 of FIG. 1 or any other desired system.

FIG. 2 shows that the method 200 can include producing 202 a reference image. The reference image can be produced 202 using images of the target prior to the occurrence of a shot. In particular, the image can be produced 202 and stored for later reference of the state of the image prior to the shot so that later changes can be identified as a hit to the target. The reference image can be produced 202 to reduce the occurrence of noise and/or stray image effects.

FIG. 2 also shows that the method 200 can include producing 204 a comparison image after a shot has occurred. In particular, the comparison image can be produced 204 using a series of images and noise reduction or other filters, as described below. Producing 204 the comparison image can be done automatically if a shot is detected, can occur at regular intervals or can be initiated by the user.

FIG. 2 further shows that the method 200 can include determining 206 a luminosity difference for each pixel of the reference image and the same pixel in the comparison image. In particular, determining 206 a luminosity difference for each pixel of the reference image and the same pixel in the comparison image can include comparing the Luma coefficients of each pixel (that is, luminosity) in the existing ITU Radiocommunication Sector (ITU-R) Recommendation BT.709 for HDTV. Using this formula, or a similar formula that has been optimized for the given application, the resulting calculations improve upon the noise reduction and anomaly identification capabilities of the software, and the resulting values are set for high definition (HD) output and viewing devices, though compatible with lower definition devices as well. One of skill in the art will appreciate that the weighting values of each color value (R, G and B) can be changed based on the type of lighting used on the target. For example, the weighted formula for computing the Luma value for a single pixel can be as follows:

$$L = (0.2126 * R) + (0.7152 * G) + (0.0722 * B)$$

The comparative process is to compute the Luma value for each pixel in the Reference image, then to compute the Luma value for each pixel in the Comparison image, then to take the absolute value of the difference between each corresponding Reference and Comparison pixel value pairs. This can be written as:

$$\delta = |L_c - L_r|$$

Where $\delta$=the delta Luma value (that is, the difference value) of a pixel pair, L=the Luma value of a pixel, c=the Comparison image and r=the Reference image.

For example, consider a pair of corresponding pixels, one each from a Reference and a Comparison image. If R=229, G=238 and B=228 in the reference image and R=229, G=235 and B=227 then:

$$\delta = |233.1468 - 235.3646| = 2.2178$$

In a range of 0-255, where 0 indicates no difference in lightness and 255 indicates the maximum difference in lightness, this example Luma delta value indicates very little difference in lightness between the pixels. The pixels are essentially the same, with no anomaly.

FIG. 2 additionally shows that the method 200 can include comparing 208 the comparison image to the reference image. Comparing 208 the comparison image to the reference image can include a two-pass routine, in which the first pass calculates and collects the pixel lightness/luminosity values and calculates the adaptive noise threshold. For example, comparing 208 the comparison image to the reference image can include running 208 an adaptive threshold (squelch) function for anomaly identification. In particular, the array of Luma delta values is divided into a number of equal sampling segments, taking the highest value from each segment. The collection of highest segment values is then sorted and the squelch function is applied to the entire array. The highest n values are ignored to produce a threshold below the maximum height of the hit signature. Note that accurate identification of the highest values to ignore is dependent upon the dimensions of the hit, determining the number of spanned segments and the exact number of high values that can be ignored. As a result, the calculated threshold is adaptive to the values in the array.

The primary formula can be as follows:

$$T = \begin{cases} \frac{2}{3}\left(\left(\sum_{n=1}^{S} x + \frac{(\beta - \theta)}{S}\right) + 2\alpha\right), & T > \tau \\ \tau + \alpha, & T < \tau \end{cases}$$

Where T=Threshold value; x=The largest luminosity value in the image segment; $\tau$=The largest indexed luminosity value; S=The number of image segments; $\beta$=The maximum value of an 8-bit byte (a constant with the value of 255); $\phi$=The largest luminosity value in the image; and $\alpha$=The average luminosity value for the image. Accurately determining which value to use for Tau ($\tau$, the largest indexed luminosity value not part of the hit signature—that is, the highest non-ignored value in the sorted collection) can vary according to conditions.

Additionally or alternatively, comparing 208 the comparison image to the reference image can include applying the threshold to the collected values. Those values that pass above the threshold constitute the detected anomaly and are identified and marked for the user. Additional user-defined calculations and scenarios can be based on the detected anomaly values.

One skilled in the art will appreciate that, for all processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps, such as correcting for brightness or any other desired steps and operations without detracting from the essence of the disclosed embodiments.

Figure 3:
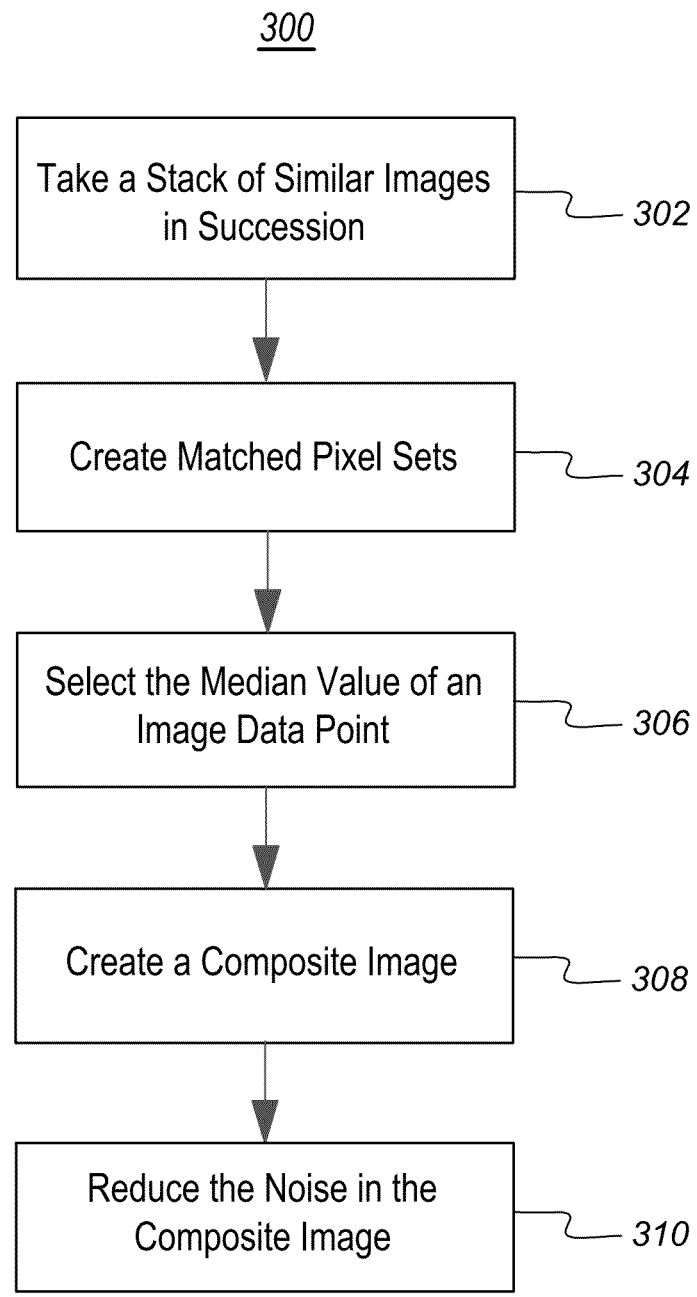
FIG. 3 is a flow chart illustrating a method of generating a reference image.

FIG. 3 is a flow chart illustrating a method 300 of generating a reference image. The reference image can be created to provide a reference to determine if a hit has occurred on a target. In particular, the reference image can be used to determine the state of the target prior to a shot being fired. The method 300 can include an image stack filter. This is a constructive filter because the fidelity of the image is enhanced rather than diminished once the noise reduction process (flaw removal) is complete.

FIG. 3 shows that the method 300 can include taking 302 a stack of similar images in succession. For example, the stack of images can include 3 or 5 images. An odd number is preferred, because it eliminates any ambiguity, as described below. The images can be taken 302 in rapid succession to reduce the opportunities for the target to change. For example, the images can be taken 302 at a speed of between 5-30 frames per second.

FIG. 3 also shows that the method 300 can include creating 304 matched pixel sets. The matched pixel sets can be created 304 by saving the data from each of the stacked images. For example, the first pixel of the first image, first pixel of the second image, first pixel of the third image, etc. are all combined into a first matched pixel set. The process is repeated for the second pixel of each image then the third pixel, etc.

FIG. 3 further shows that the method 300 can include selecting 306 the median value of an image data point (not the mean/average value, which produces worse results). I.e., if the image is saved using R, G and B values, the medial value is selected 306 for each of the data points. For example, if the R set of the three candidate images consists of 229 from Candidate 1, 222 from Candidate 2 and 230 from Candidate 3 then the median value of the R set for the first pixel is 229—the value from Candidate 1. Therefore the R value for pixel 1 for the composite image is set at 229. This is repeated for the G and B values of the pixel, each evaluated separately.

FIG. 3 additionally shows that the method 300 can include creating 308 a composite image. The composite image can be created 308 by collecting each of the pixel values determined using the median value. In particular, the composite image is created 308 by selecting 306 the median value of all image data points and substituting in the values for each pixel resulting in the composite image. I.e., the composite image is composed of the median values of each pixel set. This has the effect of reducing or eliminating random white noise spikes and dips in the image, producing a more visually coherent image (both for human visualization as well as for computer processing).

FIG. 3 moreover shows that the method 300 can include reducing 310 the noise in the composite image. For example, reducing 310 the noise can include mean-values filtering. Mean-values filtering is a destructive (erosion), mean-values, convolution-type filter for image noise reduction. Further noise reduction 310 is desirable to achieve the lowest noise possible. The method can reduce or eliminate the need for a convolution mask because its effects are additive (until the image is completely eroded).

Figure 4:
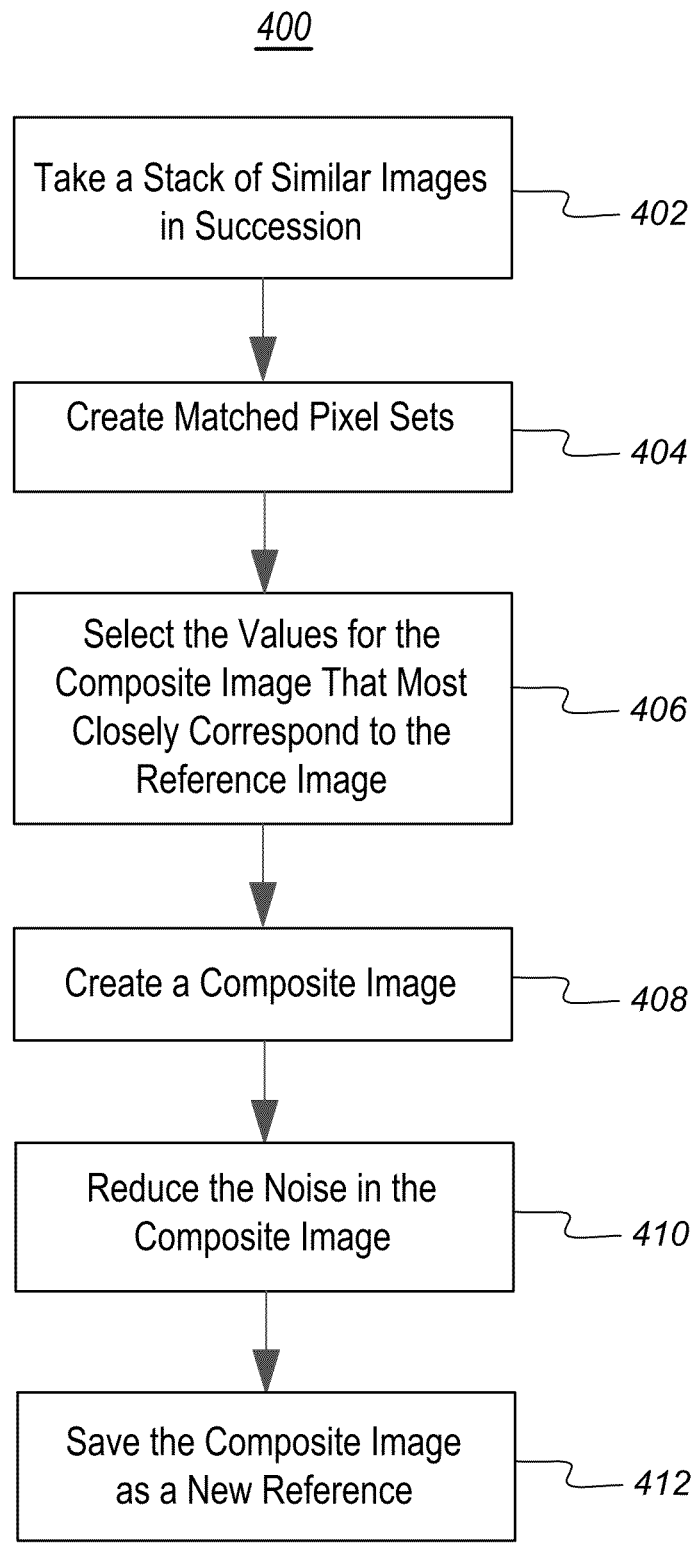
FIG. 4 is a flow chart illustrating a method of generating a comparison image.

FIG. 4 is a flow chart illustrating a method 400 of generating a comparison image. The comparison image can be created to determine if a hit has occurred on a target. In particular, the comparison image can be used to determine the state of the target subsequent to a shot being fired. The method 400 can include an image stack filter. This is a constructive filter because the fidelity of the image is enhanced rather than diminished once the noise reduction process (flaw removal) is complete.

FIG. 4 shows that the method 400 can include taking 402 a stack of similar images in succession. For example, the stack of images can include 3 or 5 images. An odd number is preferred, because it eliminates any ambiguity, as described below. The images can be taken 402 in rapid succession to reduce the opportunities for the target to change. For example, the images can be taken 402 at a speed of between 5-30 frames per second.

FIG. 4 also shows that the method 400 can include creating 404 matched pixel sets. The matched pixel sets can be created 404 by saving the data from each of the stacked images. For example, the first pixel of the first image, first pixel of the second image, first pixel of the third image, etc. are all combined into a first matched pixel set. The process is repeated for the second pixel of each image then the third pixel, etc.

FIG. 4 further shows that the method 400 can include selecting 406 the values for the composite image that most closely correspond to the reference image. I.e., if the image is saved using R, G and B values, the value of each data point is selected 406 which is closest numerically to the reference value. For example, if the R set of the three candidate images consists of 229 from Candidate 1, 134 from Candidate 2, 230 from Candidate 3 and the R value of the reference is 229 the R value that is most like the reference value for the first pixel is 229—the value from Candidate 1. In fact, this value is identical to the reference value in this example; therefore, the noise differential of this color value for this pixel is a very desirable zero. Resultantly, the R value of pixel 1 for the composite image is set at 229. This is repeated for the G and B values of the pixel, each evaluated separately.

FIG. 4 additionally shows that the method 400 can include creating 408 a composite image. The composite image can be created 408 by collecting each of the pixel values determined using comparison to the reference image. In particular, the composite image is created 408 by selecting 406 the values for the composite image that most closely corresponds to the reference image of all image data points and substituting in the values for each pixel resulting in the composite image. I.e., the composite image is composed of the selected 406 values of each pixel set. This has the effect of reducing noise and anomalous differences between the comparison and reference images to a minimum, while preserving significant anomalies.

FIG. 4 moreover shows that the method 400 can include reducing 410 the noise in the comparison image. For example, reducing 410 the noise can include mean-values filtering. Mean-values filtering is a destructive (erosion), mean-values, convolution-type filter for image noise reduction. Further noise reduction 410 is desirable to achieve the lowest noise possible. The method can reduce or eliminate the need for a convolution mask because its effects are additive (until the image is completely eroded).

A mean-values filter works by calculating the mean (average) of the values in a 3×3 pixel matrix, then applying that mean value to the center pixel of the matrix. That is, the average of all 9 pixels in the matrix is assigned to the center pixel. The effect is to remove or reduce white noise by erosion—the peaks and valleys are averaged out. This is a destructive filter because the averaging and erosion process causes the image to become blurred—a process that diminishes the visual fidelity of the image, though does not diminish its usefulness if used correctly.

In practice, many mean-values filter algorithms only process a subset of the pixels within the image. This is because a full 3×3 matrix cannot be applied to every pixel in the image. Processing only a subset of the total number of pixels is typically sufficient for visual applications, though wholly insufficient in applications where the numeric values must be used for other calculations. Because the mean-values filter in its typical implementation is also a convolution filter (one of many types of convolutions possible), a convolution mask that defines the mean-values convolution is usually applied to a generic convolution filter algorithm.

However, the current algorithm does not require a convolution mask because other convolution types are not necessary. It is also capable of processing every pixel in the image, including corner pixels (a 2×2 matrix) and edge pixels (a 3×2 matrix). Therefore it is more efficient than many similar algorithms (in that it does not ignore pixels) and yet it is faster because it does not have to perform the mask calculations or potential offset calculations of a full, convolution-mask filter. The number of mask calculations it avoids for a specific matrix size is defined by the formula:

$$A = n * x * y$$

where n is the uniform number of color values per pixel, and x and y define the dimensions of the matrix. Therefore, assuming three color values per pixel (R, G, & B), the algorithm eliminates 27 calculations for each 3×3 matrix ($3^3$), 18 calculations for each 3×2 matrix ($2*3^2$), and 12 calculations for each 2×2 matrix ($3*2^2$) for a total reduction of 9,154,308 calculations for a standard 708×480 pixel image. Even with significantly fewer calculations, the algorithm still achieves the same or better results as other mean-values filter algorithms.

FIG. 4 also shows that the method 400 can include saving 412 the composite image as a new reference image. That is, the composite image is saved 412 and can be used in subsequent detection series. In this manner, each subsequent shot can be identified and scored if desired. One of skill in the art will appreciate that saving 412 the composite image as a new reference image can occur after the composite image has been compared to the previous reference image to determine hit correction, as described above. One of skill in the art will further appreciate that saving 412 the composite image as a new reference image need not necessarily occur at the end of the method 400. For example, saving 412 the composite image as a new reference image can occur after comparison to the initial reference image or can occur as a first step before a new comparison image is created.

Figure 5:
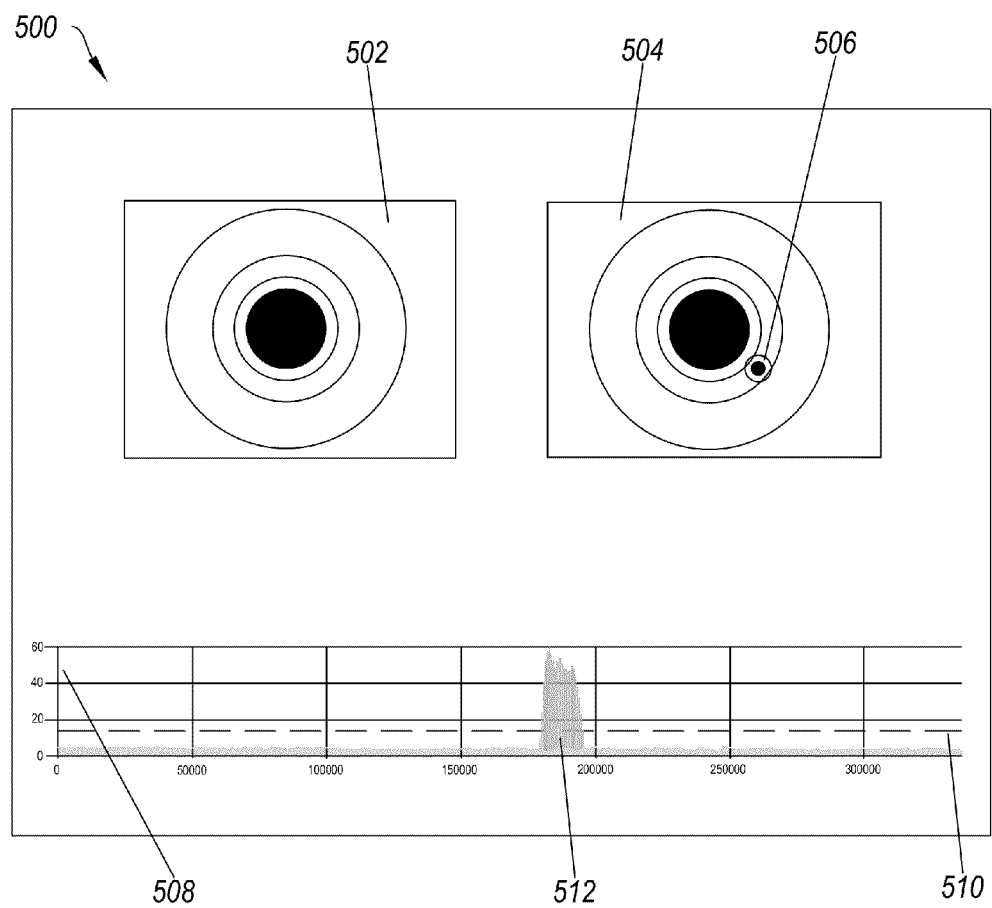
FIG. 5 illustrates an example of a representation displayed to a user after a shot detection system has determined that a hit has occurred.

FIG. 5 illustrates an example of a representation 500 displayed to a user after a shot detection system, such as the shot detection system 100 of FIG. 1, has determined that a hit has occurred. The representation 500 can allow a user to view the hit and can indicate the hit to the user.

FIG. 5 shows that the representation 500 can include a reference image 502. The reference image 502 can include information about the target before the shot occurred. One of skill in the art will appreciate that the target need not be "pristine." That is, the reference image 502 can already have one or more shots in the target. However, the reference image 502 shows the state of the target before the latest shot occurred.

FIG. 5 also shows that the representation 500 can include a comparison image 504. The comparison image 504 can include information about the target subsequent to the shot occurring. In particular, the comparison image 504 can show the hit on the target.

FIG. 5 further shows that the comparison image 506 can include a marking 506. The marking 506 can indicate the detected hit. That is, the marking 506 can provide a visual indication to the user of where the hit occurred. The user can then evaluate the accuracy of the shot. Additionally or alternatively, the accuracy can be determined electronically and then displayed to the user, either by the marking 506 or through some other means. For example, the marking 506 can be displayed in different colors depending on how close the shot is to the desired mark. Additionally or alternatively, the accuracy can be shown in text which is displayed to the user.

FIG. 5 additionally shows that the representation 500 can include Luma data 508. The Luma data 508 can be used to indicate that a hit has occurred. In particular, the color luminosity of a group of pixels will be changed because of the change of appearance where the hit occurred. The Luma data 508 can indicate the Luma values of all pixels in the image.

FIG. 5 moreover shows that the Luma data can include a threshold line 510. The threshold line 510 indicates data above which is considered a significant change to indicate that a hit has occurred. I.e., the threshold line 510 indicates a Luma value above which any change in Luma is marked as a hit. The threshold line 510 is calculated to exclude noise, as described above.

FIG. 5 also shows that the Luma data can include a peak 512. The peak 512 includes all Luma data above the threshold line 510. The peak 512 includes all pixels which have changed significantly enough to indicate that a hit has occurred on the target. I.e., the peak 512 indicates the portion of the image which has changed, thus indicating that a hit occurred at the indicated location.

One of skill in the art will appreciate that the representation 500 can include other data. For example, the representation 500 can show a history of recent shots or even an entire range session. Additionally or alternatively, the representation 500 can score a shot and show the distance from the marking 506 to the bulls eye or other intended target. I.e., the representation 500 can show any data desired by the user.

Figure 6:
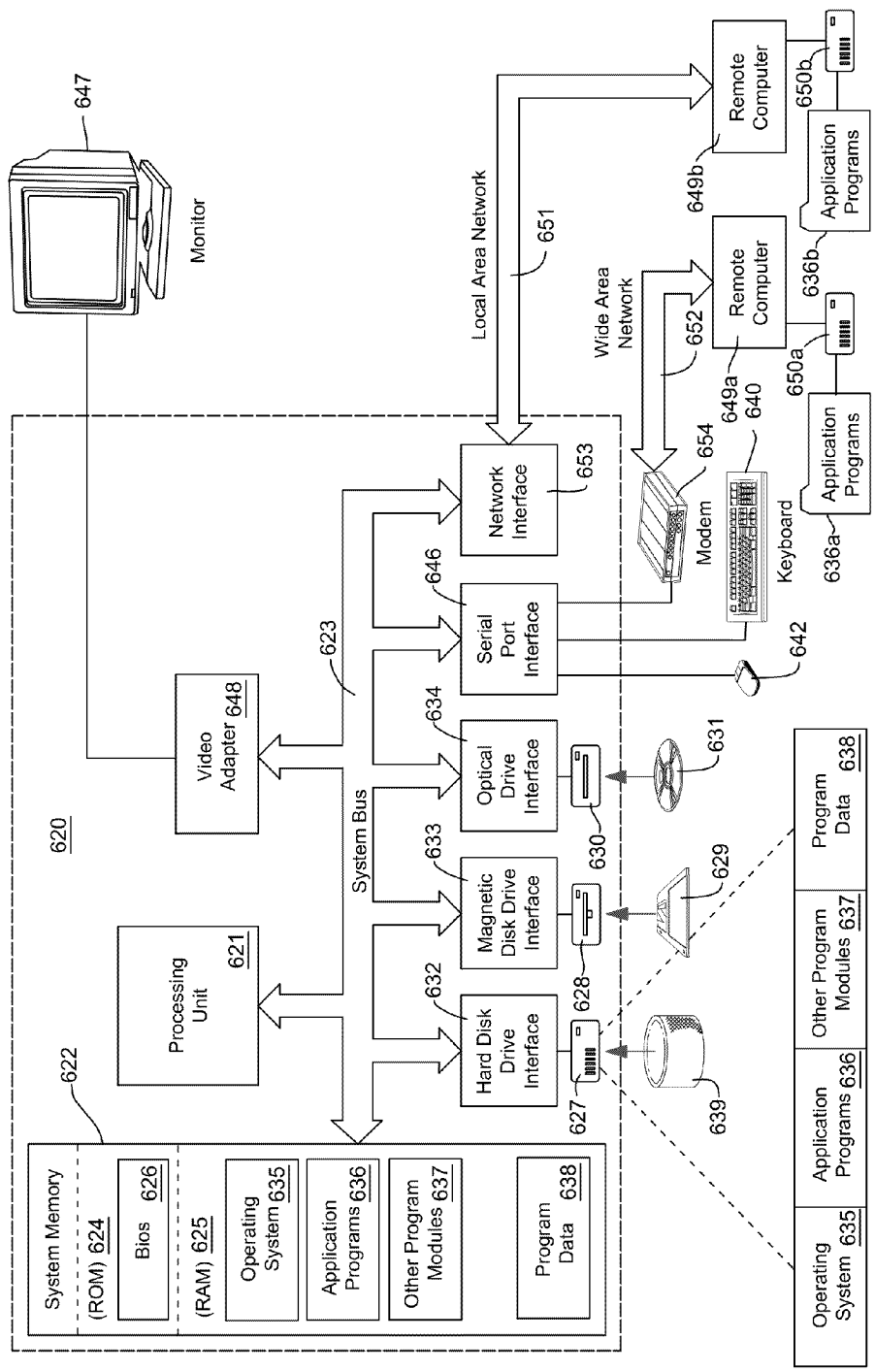
FIG. 6 illustrates an example of a suitable computing environment in which the invention may be implemented.

FIG. 6, and the following discussion, is intended to provide a brief, general description of a suitable computing environment in which the invention may be implemented. Although not required, the invention will be described in the general context of computer executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

One skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. It should be noted however, that as mobile phones become more sophisticated, mobile phones are beginning to incorporate many of the components illustrated for conventional computer 620. Accordingly, with relatively minor adjustments, mostly with respect to input/output devices, the description of conventional computer 620 applies equally to mobile phones. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device, a handheld mobile phone or tablet computer or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 can be connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for identifying a hit on a target, the system comprising: a digital camera;
   a computing device configured to:
      produce a reference image of a target prior to a shot occurring, wherein producing a reference image includes:
         taking a stack of similar images in succession using the digital camera;
         creating matched pixel sets which include data from the same pixel in each of the stack of similar images;
         selecting the median value of each image data point in each matched pixel set;
      and creating a composite image using the selected data from each matched pixel set;
         produce a comparison image of the target subsequent to the shot occurring; and
         compare the comparison image to the reference image; and
   a networking device configured to connect the digital camera to the computing device;
   wherein producing a comparison image includes taking a second stack of similar images in succession using the digital camera;
   wherein producing the comparison image includes creating matched pixel sets which include data from the same pixel in each of the second stack of similar images;
   wherein producing the comparison image includes selecting the value of each image data point in each matched pixel set that most closely corresponds to the reference image.

2. The system of claim 1, wherein the second stack of similar images includes three images.

3. The system of claim 1, wherein the second stack of similar images includes five images.

4. The system of claim 1, wherein producing a reference image includes creating a composite image using the selected data from each matched pixel set.

5. The system of claim 4, wherein producing a reference image includes reducing the noise in the composite image.

6. A system for identifying a hit on a target, the system comprising:
   a digital camera;
   a computing device configured to:
      produce a reference image of a target prior to a shot occurring, wherein producing a reference image includes:
         taking a stack of similar images in succession using the digital camera;
         creating matched pixel sets which include data from the same pixel in each of the stack of similar images;
         selecting the median value of each image data point in each matched pixel set;
         creating a composite image using the selected data from each matched pixel set; and
         reducing the noise in the composite image;
      produce a comparison image of the target subsequent to the shot occurring, wherein producing a comparison image includes:
         taking a second stack of similar images in succession using the digital camera;
         creating matched pixel sets which include data from the same pixel in each of the second stack of similar images;
         selecting the value of each image data point in each matched pixel set that most closely corresponds to the reference image;
         creating a composite image using the selected data from each matched pixel set; and
         reducing the noise in the composite image; compare the comparison image to the reference image;
   a first networking device connected to the digital camera; and
   a second networking device: connected to the computing device; and configured to connect the digital camera to the computing device.

7. The system of claim 6, wherein comparing the comparison image to the reference image includes determining a luminosity difference for each pixel.

8. The system of claim 7, determining a threshold limit, above which the luminosity difference is significant.

9. The system of claim 8, marking the pixels above the threshold limit for the user.

* * * * *